US010821986B2

(12) United States Patent
Yamada et al.

(10) Patent No.: US 10,821,986 B2
(45) Date of Patent: Nov. 3, 2020

(54) CONTROL APPARATUS FOR HYBRID VEHICLE

(71) Applicant: TOYOTA JIDOSHA KABUSHIKI KAISHA, Toyota (JP)

(72) Inventors: Kazuhiko Yamada, Okazaki (JP); Yukihiko Ideshio, Nisshin (JP); Hiroki Morita, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/423,301

(22) Filed: May 28, 2019

(65) Prior Publication Data
US 2019/0359216 A1 Nov. 28, 2019

(30) Foreign Application Priority Data

May 25, 2018 (JP) .................. 2018-101055

(51) Int. Cl.
*B60W 30/19* (2012.01)
*B60W 20/40* (2016.01)
*B60K 6/383* (2007.10)
*B60K 6/40* (2007.10)
*B60K 6/48* (2007.10)

(52) U.S. Cl.
CPC ............. *B60W 30/19* (2013.01); *B60K 6/383* (2013.01); *B60K 6/40* (2013.01); *B60W 20/40* (2013.01); *B60K 2006/4825* (2013.01)

(58) Field of Classification Search
CPC ....... B60W 30/19; B60W 20/40; B60K 6/383; B60K 6/40; B60K 2006/4825
See application file for complete search history.

(56) References Cited

U.S. PATENT DOCUMENTS

| 2002/0123409 | A1 | 9/2002 | Suzuki et al. | |
| 2013/0157806 | A1* | 6/2013 | Koyama | B60W 20/00 477/5 |
| 2014/0094341 | A1 | 4/2014 | Ruder et al. | |
| 2014/0371965 | A1 | 12/2014 | Ideshio et al. | |

(Continued)

FOREIGN PATENT DOCUMENTS

| JP | 2002-204506 A | 7/2002 |
| JP | 2004-140993 A | 5/2004 |
| WO | 2013/061373 A1 | 5/2013 |

*Primary Examiner* — Tisha D Lewis
(74) *Attorney, Agent, or Firm* — Oliff PLC

(57) ABSTRACT

A control apparatus for a hybrid vehicle in which a friction clutch and a one-way clutch are disposed in parallel with each other between an engine and an electric motor. The transmission is disposed between the electric motor and drive wheels. The friction clutch connects and disconnects between the engine and the electric motor. The one-way clutch transmits a drive force in a direction from the engine toward the electric motor. The vehicle runs in (i) an electric-motor running mode with operation of the electric motor or (ii) a hybrid running mode with operation of the engine. The control apparatus is configured, upon execution of a shift-up action of the transmission with the hybrid running mode being selected and with the friction clutch being in a non-engaged state, to execute a shift-up action control by which the shift-up action starts to be executed after the friction clutch has been engaged.

16 Claims, 5 Drawing Sheets

(56) References Cited

U.S. PATENT DOCUMENTS

| | | | |
|---|---|---|---|
| 2015/0031502 A1* | 1/2015 | Kaltenbach | B60W 10/111 |
| | | | 477/5 |
| 2015/0088348 A1* | 3/2015 | Lee | B60K 6/48 |
| | | | 701/22 |
| 2015/0119190 A1* | 4/2015 | Isomura | B60K 6/547 |
| | | | 477/3 |

* cited by examiner

CONTROL APPARATUS FOR HYBRID VEHICLE

This application claims priority from Japanese Patent Application No. 2018-101055 filed on May 25, 2018, the disclosure of which is herein incorporated by reference in its entirety.

FIELD OF THE INVENTION

The present invention relates to a control apparatus for a hybrid vehicle that includes an engine, an electric motor, a friction clutch, a one-way clutch, a transmission and drive wheels, wherein the friction clutch and the one-way clutch are disposed in parallel to each other between the engine and the electric motor that is connected to the drive wheels through the transmission, and wherein the control apparatus is configured to execute controls in a shift-up action executed in the transmission.

BACKGROUND OF THE INVENTION

There is known a control apparatus for a hybrid vehicle in which a friction clutch and a one-way cutch are disposed in parallel to each other between an engine and an electric motor. A control apparatus, which is disclosed in U.S. Patent Application Publication No. 2014/0094341, is an example of such a control apparatus. In the control apparatus disclosed in this document, the friction clutch is held engaged during an operation of the engine, and is released during an acceleration or an inertia running with acceleration off, i.e., a shift-up action in a coast running.

SUMMARY OF THE INVENTION

However, in the arrangement in which the friction clutch is released during execution of the shift-up action, the friction clutch is engaged when rotational speeds of the engine and the electric motor have been synchronized with each other after completion of the shift-up action, so that a responsiveness of a drive force is likely to be low. Further, depending on a condition of the electric motor, there is a case in which the rotational speed of the electric motor cannot be immediately reduced. Thus, there has been a need for improvement in a shifting control during the shift-up action executed in the hybrid vehicle in which the friction clutch and the one-way cutch are disposed in parallel to each other between the engine and the electric motor that is connected to the drive wheels through the transmission.

The present invention was made in view of the background art described above. It is therefore an object of the present invention to provide a control apparatus for a hybrid vehicle in which a friction clutch and a one-way cutch are disposed in parallel to each other between an engine and an electric motor that is connected to drive wheels through a transmission, wherein the control apparatus is capable of improving a shifting responsiveness in a shift-up action executed during a hybrid running with operation of the engine, and reducing a time required to complete the shift-up action.

The object indicated above is achieved according to the following aspects of the present invention.

According to a first aspect of the invention, there is provided a control apparatus for a hybrid vehicle that includes an engine, an electric motor, a friction clutch, a one-way clutch, an automatic transmission and drive wheels, such that the friction clutch and the one-way clutch are disposed in parallel with each other between the engine and the electric motor, and such that the automatic transmission is disposed between the electric motor and the drive wheels, wherein the friction clutch is configured to connect and disconnect between the engine and the electric motor, while the one-way clutch is configured to transmit a drive force in a direction from the engine toward the electric motor, wherein the hybrid vehicle is to run in a selected one of (i) an electric-motor running mode with operation of the electric motor and (ii) a hybrid running mode with operation of the engine, and wherein the control apparatus is configured, upon execution of a shift-up action of the automatic transmission with the hybrid running mode being selected and with the friction clutch being in a non-engaged state, to execute a first shift-up action control by which the shift-up action starts to be executed after the friction clutch has been engaged. For example, the control apparatus includes: a first shift-up action control portion configured to execute the first shift-up action control by which the shift-up action starts to be executed after the friction clutch has been engaged; and a second shift-up action control portion configured to execute a second shift-up action control by which the shift-up action is executed with the friction clutch being held in the non-engaged state and with a torque of the electric motor being temporarily reduced during execution of the shift-up action.

According to a second aspect of the invention, in the control apparatus according to the first aspect of the invention, the control apparatus is configured to execute the first shift-up action control, when at least one of at least one predetermined condition is satisfied upon execution of the shift-up action of the automatic transmission with the hybrid running mode being selected and with the friction clutch being in the non-engaged state, wherein the control apparatus is configured, when the at least one of the at least one predetermined condition is not satisfied upon execution of the shift-up action of the automatic transmission with the hybrid running mode being selected and with the friction clutch being in the non-engaged state, to execute a second shift-up action control by which the shift-up action is executed with the friction clutch being held in the non-engaged state and with a torque of the electric motor being temporarily reduced during execution of the shift-up action.

According to a third aspect of the invention, in the control apparatus according to the second aspect of the invention, when the first shift-up action control is executed, at least a torque of the engine is temporarily reduced during execution of the shift-up action, wherein, when the second shift-up action control is executed, the torque of the electric motor is temporarily reduced during execution of the shift-up action.

According to a fourth aspect of the invention, in the control apparatus according to the first aspect of the invention, the friction clutch is configured to connect and disconnect two rotary members, wherein the control apparatus configured to execute the first shift-up action control, when a difference between the a rotational speed of one of the two rotary members and a rotational speed of the other of the two rotary members is not larger than a given difference value, or when a required acceleration of the hybrid vehicle is not higher than a given acceleration value.

According to a fifth aspect of the invention, in the control apparatus according to the third aspect of the invention, when the first shift-up action control is executed, the torque of the electric motor as well as the torque of the engine is temporarily reduced during execution of the shift-up action, such that the torque of the electric motor is reduced by an amount that is larger than an amount by which the torque of the engine is reduced.

According to a sixth aspect of the invention, in the control apparatus according to the third aspect of the invention, when the first shift-up action control is executed, at least the torque of the engine is temporarily reduced for obtaining a required torque-reduction amount that is calculated based on a target length of shifting time of the shift-up action, and when the second shift-up action control is executed, the torque of the electric motor is temporarily reduced for obtaining the required torque-reduction amount. For example, the term "required torque-reduction amount" may be interpreted to mean a required torque-reduction amount by which an input torque acting on an input shaft of the automatic transmission is required to be reduced.

According to a seventh aspect of the invention, in the control apparatus according to the fifth or sixth aspect of the invention, when the first shift-up action control is executed, the torque of the engine is reduced to a reduced torque, and the friction clutch is controlled to have a torque capacity that is larger than an absolute value of the reduced torque of the engine.

According to an eighth aspect of the invention, in the control apparatus according to the sixth aspect of the invention, when it is determined that the required torque-reduction amount cannot be obtained by reducing the torque of the electric motor without reducing the torque of the engine, the control apparatus is configured to execute the first shift-up action control in which the torque of the engine is reduced to a torque value that is determined such that the required torque-reduction amount is obtained.

According to a ninth aspect of the invention, in the control apparatus according to the third or fifth aspect of the invention, when it is determined that the torque of the electric motor cannot be reduced, the control apparatus is configured to execute the first shift-up action control, by reducing the torque of the engine without reducing the torque of the electric motor.

According to a tenth aspect of the invention, in the control apparatus according to the seventh aspect of the invention, when it is determined that the torque capacity of the friction clutch cannot be increased to be larger than the absolute value of the reduced torque of the engine, the amount by which the torque of the engine is to be reduced is reduced to be not larger than the torque capacity of the friction clutch.

According to an eleventh aspect of the invention, in the control apparatus according to the sixth aspect of the invention, when it is determined that the required torque-reduction amount can be obtained by reducing the torque of the electric motor without reducing the torque of the engine, the control apparatus is configured to execute the second shift-up action control.

According to a twelfth aspect of the invention, in the control apparatus according to the eleventh aspect of the invention, when the second shift-up action control is executed, a rotational speed of the engine is controlled to be not lower than a rotational speed of the electric motor.

According to a thirteenth aspect of the invention, in the control apparatus according to any one of the third, and fifth through twelfth aspects of the invention, when the first shift-up action control is executed, at least the torque of the engine is reduced in an inertia phase of a period of the execution of the shift-up action, wherein, when the second shift-up action control is executed, the torque of the electric motor is reduced in the inertia phase of the period of the execution of the shift-up action.

According to a fourteenth aspect of the invention, in the control apparatus according to the first aspect of the invention, the control apparatus is configured, upon execution of the shift-up action of the automatic transmission with the hybrid running mode being selected and with the friction clutch being in the non-engaged state, to execute a torque reduction control by which the shift-up action is executed with the friction clutch being held in the non-engaged state and with a torque of the electric motor being temporarily reduced during execution of the shift-up action.

According to a fifteenth aspect of the invention, in the control apparatus according to the fourteenth aspect of the invention, when the torque reduction control is executed, a torque reduction amount, by which the torque of the electric motor is to be reduced, is controlled such that a rotational speed of the electric motor is higher than a rotational speed of the engine during execution of the shift-up action.

In the control apparatus according to the first aspect of the invention, when a shift-up action of the automatic transmission is to be executed with the hybrid running mode being selected and with the friction clutch being in a non-engaged state, the first shift-up action control is executed whereby the shift-up action starts to be executed after the friction clutch has been engaged. Owing to this arrangement, a torque reduction caused by the engagement of the friction clutch can be utilized in the execution of the shift-up action of the automatic transmission, whereby a shifting responsiveness can be improved. Further, since the shifting action of the automatic transmission is executed with the friction clutch being placed in its engaged state, it is possible to reduce a length of time required to complete the shifting action and avoid the drive force from being delayed to be transmitted.

In the control apparatus according to the second aspect of the invention, when at least one of at least one predetermined condition is satisfied, the first shift-up action control is executed. When the at least one of the at least one predetermined condition is not satisfied, the second shift-up action control is executed whereby the shift-up action is executed with the friction clutch being held in the non-engaged state and with the torque of the electric motor being temporarily reduced during execution of the shift-up action. Owing to this arrangement, it is possible to execute one of the first shift-up action control and the second shift-up action control, which is selected suitably depending on a drive condition of the vehicle, whereby a drive force responsiveness can be improved while a shifting shock and a hydraulic pressure loss can be reduced.

In the control apparatus according to the third aspect of the invention, at least the torque of the engine is temporarily reduced during execution of the shift-up action when the first shift-up action control is executed, and the torque of the electric motor is temporarily reduced during execution of the shift-up action when the second shift-up action control is executed. Owing to this arrangement, in a case in which the length of time required to complete the shift-up action would be long if the torque reduction in the execution of the shift-up action is made by only reduction of the torque of the electric motor, it is possible to quickly execute the shift-up action by utilizing reduction of the torque of the engine, by executing the shift-up action after engaging the friction clutch.

In the control apparatus according to the fourth aspect of the invention, the control apparatus configured to execute the first shift-up action control, when the difference between the rotational speed of one of the two rotary members and the rotational speed of the other of the two rotary members is not larger than the given difference value, or when the required acceleration of the hybrid vehicle is not higher than the given acceleration value. Owing to this arrangement, when the rotational speed difference between the two rotary members is small, it is possible to increase the drive force responsiveness by executing the shift-up action of the automatic transmission after engaging the friction clutch.

In the control apparatus according to the fifth aspect of the invention, when the first shift-up action control is executed, the torque of the electric motor as well as the torque of the engine is temporarily reduced during execution of the shift-up action, such that the torque of the electric motor is reduced by an amount that is larger than an amount by which the torque of the engine is reduced. Owing to this arrangement, the torque reduction is made by using mainly the electric motor which is better in responsiveness and is capable of recycling energy, whereby the shifting responsiveness and a fuel economy of the vehicle can be both improved.

In the control apparatus according to the sixth aspect of the invention, the required torque-reduction amount, which is required in the temporal torque reduction in each of the first and second shift-up action controls, is calculated based on a target length of shifting time of the shift-up action. It is possible to execute one of the first shift-up action control and the second shift-up action control, which is selected suitably depending on a drive condition of the vehicle, whereby a drive force responsiveness can be improved while a shifting shock and a hydraulic pressure loss can be reduced.

In the control apparatus according to the seventh aspect of the invention, when the first shift-up action control is executed, the torque of the engine is reduced to a reduced torque, and the friction clutch is controlled to have a torque capacity that is larger than an absolute value of the reduced torque of the engine. Owing to this arrangement, it is possible to avoid or reduce slipping of the friction clutch, while avoiding or reducing shock upon the shift-up action owing to the obtained torque-reduction amount.

In the control apparatus according to the eighth aspect of the invention, when it is determined that the required torque-reduction amount cannot be obtained by reducing the torque of the electric motor without reducing the torque of the engine, the control apparatus is configured to execute the first shift-up action control in which the torque of the engine is reduced to a torque value that is determined such that the required torque-reduction amount is obtained. Owing to this arrangement, the required torque-reduction amount is obtained whereby the shock upon the shift-up action can be reduced. Further, for example, where the torque reduction is made by using mainly the electric motor that is controllable more accurately and quickly than the engine, it is possible to improve accuracy and speed of the torque reduction.

In the control apparatus according to the ninth aspect of the invention, when it is determined that the torque of the electric motor cannot be reduced, the control apparatus is configured to execute the first shift-up action control, by reducing the torque of the engine without reducing the torque of the electric motor, so that the shock upon the shift-up action can be reduced.

In the control apparatus according to the tenth aspect of the invention, when it is determined that the torque capacity of the friction clutch cannot be increased to be larger than the absolute value of the reduced torque of the engine, the absolute value of the reduced torque is reduced to be not larger than the torque capacity of the friction clutch. Owing to this arrangement, it is possible to restrain durability of the friction clutch from being reduced due to slipping of the friction clutch, while reducing the shock upon the shift-up action.

In the control apparatus according to the eleventh aspect of the invention, when it is determined that the required torque-reduction amount can be obtained by reducing the torque of the electric motor without reducing the torque of the engine, the control apparatus is configured to execute the second shift-up action control. Owing to this arrangement, it is possible to reduce the shock upon the shift-up action and also to improve accuracy and speed of the torque reduction by using the electric motor that is controllable more accurately and quickly than the engine.

In the control apparatus according to the twelfth aspect of the invention, when the second shift-up action control is executed, a rotational speed of the engine is controlled to be not lower than a rotational speed of the electric motor, so that it is possible to avoid a shock that could be caused in the one-way clutch after the torque reduction.

In the control apparatus according to the thirteenth aspect of the invention, the torque of the engine and/or the torque of the electric motor is reduced in the inertia phase of the period of the execution of the shift-up action, so that it is possible to reduce the shock upon the shift-up action at a point of time at which the shock is caused.

In the control apparatus according to the fourteenth aspect of the invention, upon execution of the shift-up action of the automatic transmission with the hybrid running mode being selected and with the friction clutch being in the non-engaged state, the torque reduction control is executed whereby the shift-up action is executed with the friction clutch being held in the non-engaged state and with a torque of the electric motor being temporarily reduced during execution of the shift-up action. Owing to this arrangement, the torque reduction is made by using the electric motor that is controllable more accurately and quickly than the engine, it is possible to improve accuracy and speed of the torque reduction.

In the control apparatus according to the fifteenth aspect of the invention, when the torque reduction control is executed, the torque reduction amount, by which the torque of the electric motor is to be reduced, is controlled such that the rotational speed of the electric motor is higher than the rotational speed of the engine during execution of the shift-up action. Owing to this arrangement, the rotational speed of the engine is made substantially equal to the rotational speed of the electric motor, so that it is possible to avoid a shock that could be caused by engagement of the one-way clutch during the execution of the shift-up action.

DETAILED DESCRIPTION OF PREFERRED EMBODIMENT

Hereinafter, a preferred embodiment of the invention will be described in detail with reference to the accompanying drawings.

Figure 1:
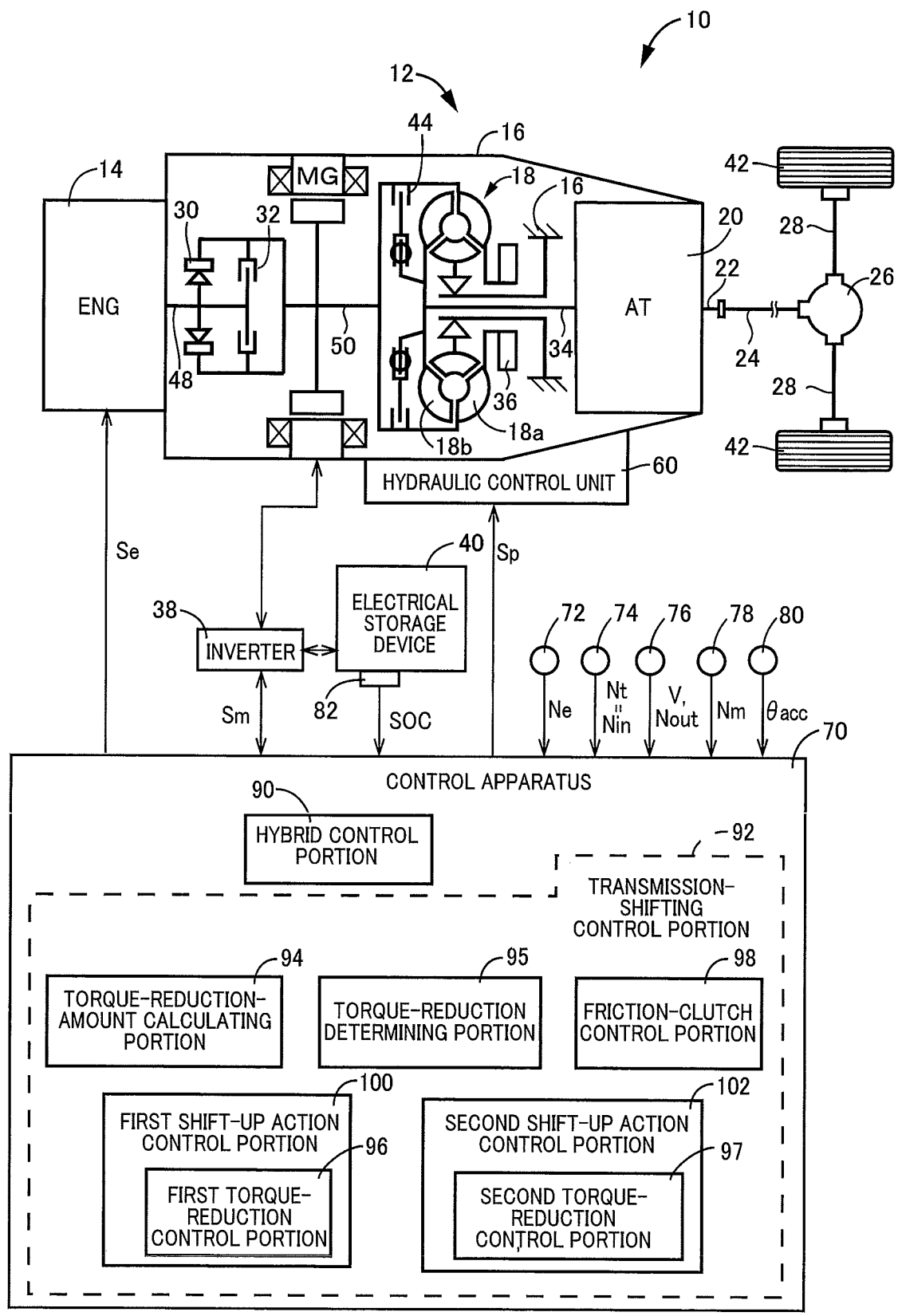
FIG. 1 is a view schematically showing a construction of a drive-force transmitting apparatus provided in a vehicle to which the present invention is applied, and explaining control functions and a main part of a control system in the vehicle.

FIG. 1 is a view schematically showing a construction of a drive-force transmitting apparatus 12 provided in a vehicle 10 to which the present invention is applied, and explaining control functions and a main part of a control system in the vehicle 10. The vehicle 10 is a hybrid vehicle provided with an engine 14 and an electric motor MG each of which serves as a drive force source for enabling the vehicle 10 to run. As shown in FIG. 1, the drive-force transmitting apparatus 12 includes a transmission casing 16 as a non-rotary member, a one-way clutch 30, a friction clutch (that may be referred also to as a K0 clutch) 32, a torque converter 18 and an automatic transmission 20. Within the transmission casing 16, the one-way clutch 30 and friction clutch 32, which are disposed in parallel with each other, the torque converter 18 and the automatic transmission 20 are arranged in this order in a direction away from the engine 14, i.e., rightward direction as seen in FIG. 1. The drive-force transmitting apparatus 12 further includes a transmission output shaft 22 as an output rotary member of the transmission 20, a propeller shaft 24 connected to the transmission output shaft 22, a differential gear 26 connected to the propeller shaft 24, and a pair of axles 28 connected to the differential gear 26. The torque converter 18 includes a pump impeller 18a that is connected directly to the electric motor MG through a connecting shaft 50 and is connected to a crank shaft 48 of the engine 14 through the connecting shaft 50, one-way clutch 30 and friction clutch 32. The torque converter 18 further includes a turbine impeller 18b that is connected directly to a transmission input shaft 34 that is an input rotary member of the automatic transmission 20. The drive-force transmitting apparatus 12 constructed as described above is advantageously used in the vehicle 10 of the FR (front-engine rear-drive) type, for example.

The vehicle 10 includes: a mechanical oil pump 36 that is connected to, for example, the pump impeller 18a; an inverter 38 configured to control operation of the electric motor MG; an electrical storage device 40 configured to supply and receive an electric power to and from the electric motor MG via the inverter 38; and a hydraulic control unit 60 configured to control various hydraulic operations such as operations made to execute shifting actions of the automatic transmission 20, operations made to engage and release the friction clutch 32 and operations made to engage and release a known lockup clutch 44 provided in the torque converter 18. The oil pump 36 is to be operated by the engine 14 and/or the electric motor MG to generate an original pressure of a working fluid which is supplied to the hydraulic control unit 60, namely, which is provided for the operations made to execute the shifting actions of the automatic transmission 20, the operations made to engage and release the friction clutch 32 and the operations made to engage and release the lockup clutch 44.

The automatic transmission 20 transmits drive forces provided from the engine 14 and the electric motor MG, toward drive wheels 42. The automatic transmission 20 includes at least one known planetary gear set, and is configured to establish a selected one of a plurality of gear positions (ratios) by a shifting action that is executed by releasing and engaging actions of corresponding ones of a plurality of engagement devices also included in the automatic transmission 20. That is, the automatic transmission 20 is a step-variable transmission that is to be shifted up or down from one of the plurality of gear positions to another by so-called "clutch-to-clutch" shifting operation, so as to change a rotational speed of the transmission input shaft 34 and output the changed rotational speed as a rotational speed of the transmission output shaft 22. The transmission input shaft 34 corresponds also to a turbine shaft that is to be rotated by the turbine impeller 18b of the torque converter 18. Each of the plurality of hydraulically-operated frictional engagement devices (hereinafter simply referred to as clutches C unless they are to be particularly distinguished from one another) is a clutch or brake controlled by the hydraulic control unit 60 so as to be engaged and released. A torque capacity or engaging force of each of the clutches C is changeable by regulation of a corresponding one of solenoid valves or the like that are included in the hydraulic control unit 60, so that each clutch C is configured to selectively connect and disconnect two members that are disposed on respective opposite sides of the clutch C interposed between the two members.

The electric motor MG is a so-called motor generator having functions of both a motor and a generator. That is, the electric motor MG serves as the motor to generate a mechanical power from an electric energy and also serves as the generator to generate an electric energy from a mechanical energy. In place of or addition to the engine 14, the electric motor MG generates a drive force by which the vehicle 10 is caused to run, based on an electric power (that is synonymous to the electric energy unless otherwise specified) supplied from the electrical storage device 40 via the inverter 38. Further, the electric motor MG converts a drive force generated by the engine 14 and a driven force supplied from the drive wheels 42, into the electric power by regeneration, and stores the regenerated electric power into the electrical storage device 40 through the inverter 38. The electric motor MG is disposed in a drive-force transmitting path between the engine 14 and the drive wheels 42, and is connected to the connecting shaft 50 between the torque converter 18 and the two clutches (that are the one-way clutch 30 and the friction clutch 32), so that the force is transmittable between the electric motor MG and the pump impeller 18a of the torque converter 18. Thus, the electric motor MG is connected to the transmission input shaft 34 of the automatic transmission 20 in a force transmittable manner, without via the one-way clutch 30 and the friction clutch 32.

The hybrid vehicle 10 is capable of running in a selected one of an electric-motor running (EV (Electric Vehicle) running) mode and a hybrid running (HV (Hybrid Vehicle) running) mode. Specifically, in the electric-motor running mode that is to be selected in a region requiring a low required driving force, i.e., a low load, the vehicle 10 is caused to run by the electric motor MG as the drive force source that is subjected to a power-running control with the rotation of the engine 14 being stopped. In the hybrid running mode, the vehicle 10 is caused to run by at least the engine 14 as the drive force source. That is, the term "hybrid running" encompasses a running by both of the engine 14 and the electric motor MG serving as the drive force sources, a running by only the engine 14 serving as the drive force source, and a driving by the engine 14 as serving as the drive force source, with the electric motor MG being subjected to a regenerative control so as to generate a reaction force.

The one-way clutch 30 has a known construction constituted mainly by, for example, an inner plate, an outer plate and a ratchet mechanism, wherein each of the inner and outer plates is allowed, by the ratchet mechanism, to be rotated relative to the other in one of opposite directions, and is inhibited, by the ratchet mechanism, from being rotated relative to the other in the other of the opposite direction. The friction clutch 32 is, for example, a hydraulically-operated frictional engagement device of wet multi-plate type, which is controlled by the hydraulic control unit 60 using an original pressure in the form of the hydraulic pressure generated by the oil pump 36, so as to be engaged and released to connect and disconnect two rotary members in the form of the crank shaft 48 and the connecting shaft 50. In the control for engaging and releasing the friction clutch 32, a torque capacity Tck of the friction clutch 32 is changed, for example, by regulation of a solenoid valve or the like (not shown) that is included in the hydraulic control unit 60. The one-way clutch 30 transmits, from the engine 14 to the electric motor MG, only a drive force acting in a forward direction. A torque capacity of the friction clutch 32 is set to be smaller than a torque capacity Tco of the one-way clutch 30, for example. The friction clutch 32 is placed in its engaged state, for example, when the engine 14 is cranked to be started. In this case, the engine 14 is released after the engine 14 has been started.

As shown in FIG. 1, the vehicle 10 is provided with an electronic control apparatus 70 including a control apparatus for the vehicle 10, which relates to, for example, operation of the friction clutch 32. For example, the electronic control apparatus 70 includes a so-called microcomputer incorporating a CPU, a ROM, a RAM and an input-output interface. The CPU performs various control operations of the vehicle 10, by processing various input signals, according to control programs stored in the ROM, while utilizing a temporary data storage function of the RAM. The electronic control apparatus 70 is configured to perform, for example, an engine control operation for controlling an output of the engine 14, an electric-motor control operation for controlling an output of the electric motor MG, a shifting control operation for controlling a shifting action of the automatic transmission 20 and a torque-capacity control operation for controlling the torque capacity of the friction clutch 32, wherein the motor control operation includes a regenerative control of the electric motor MG. The electronic control apparatus 70 may be constituted by two or more control units exclusively assigned to perform different control operations such as the engine control operation, the electric-motor control operation and the hydraulic-pressure control operation. The electronic control apparatus 70 receives various input signals based on values detected by respective sensors provided in the vehicle 10. Specifically, the electronic control apparatus 70 receives: an output signal of an engine speed sensor 72 indicative of an engine rotational speed Ne which is a rotational speed of the engine 14; an output signal of an input speed sensor 74 indicative of a turbine rotational speed Nt (which is a rotational speed of the turbine impeller 18b), i.e., an input-shaft rotational speed Nin (which is a rotational speed of the transmission input shaft 34); an output signal of an output speed sensor 76 indicative of an output-shaft rotational speed Nout which is a rotational speed of the transmission output shaft 22 and which corresponds to a running speed V of the vehicle 10; an output signal of a motor speed sensor 78 indicative of a motor rotational speed Nm which is a rotational speed of the electric motor MG; an output signal of an accelerator-operation amount sensor 80 indicative of an accelerator operation amount θacc which represents an amount of accelerating operation made by an operator of the vehicle 10 and which corresponds to a required drive force of the vehicle 10 required by the operator; and an output signal of a battery sensor 82 indicative of a charging state (stored electric power amount) SOC of the electrical storage device 40. Further, the electronic control apparatus 70 generates various output signals which are supplied to various devices such as the hydraulic control unit 60 and which include an engine-control command signal Se for controlling the output of the engine 12, an electric-motor-control command signal Sm for controlling the operation of the electric motor MG, and a hydraulic-control command signal Sp for engaging and releasing the friction clutch 32 and executing shifting actions of the automatic transmission 20.

For performing various control operations in the vehicle 10, the electronic control apparatus 70 includes a hybrid control means or portion in the form of a hybrid control portion 90 and a transmission shifting control means or portion in the form of a transmission-shifting control portion 92. The hybrid control portion 90 has a function of controlling operation of the engine 14 serving as the drive force source and a function of controlling operation of the electric motor MG serving as the drive force source and the generator, and is configured to execute a hybrid drive control to cause the vehicle 10 to perform selectively the electric motor running with the drive force source being the electric motor MG and the hybrid running with the drive force source being at least the engine 14.

The transmission-shifting control portion 92 determines whether a shifting action is to be executed or not, based on, for example, the accelerator operation amount θacc and the vehicle running speed V, in accordance with a predetermined relationship in the form of a shifting map, and controls the shifting action when determining that the shifting action is to be executed. Further, the transmission-shifting control portion 92 includes: a torque-reduction-amount calculating means or portion in the form of a torque-reduction-amount calculating portion 94; a torque-reduction determining means or portion in the form of a torque-reduction determining portion 95; a friction-clutch control means or portion in the form of a friction-clutch control portion 98; a first shift-up action control means or portion in the form of a first shift-up action control portion 100; and a second shift-up action control means or portion in the form of a second shift-up action control portion 102. The first shift-up action control portion 100 includes a first torque-reduction control means or portion in the form of a first torque-reduction control portion 96. The second shift-up action control portion 102 includes a second torque-reduction control means or portion in the form of a second torque-reduction control portion 97.

The torque-reduction-amount calculating portion 94 calculates a required torque-reduction amount Ttd that is required to reduce a shifting shock that is caused by a torque fluctuation in a shift-up action. Specifically, during running of the vehicle 10 at the running speed V that is not lower than a given speed value Va, when the transmission-shifting control portion 92 determines that a shift-up action is required to be executed and the friction-clutch control portion 98 determines that the friction clutch 32 is in its released state, the torque-reduction-amount calculating portion 94 calculates the required torque-reduction amount Ttd that is required to reduce the shifting shock that is caused by the torque fluctuation in an inertia phase of the shift-up action. The required torque-reduction amount Ttd is, for example, a torque reduction amount by which a torque acting on the transmission input shaft 34 is to be reduced. The required torque-reduction amount Ttd in the inertia phase of the shift-up action, namely, in a period in which the rotational speeds of rotary members (such as the electric motor MG) are being changed to rotational speeds upon completion of the shift-up action from initiation of the shift-up action, is calculated in accordance with equation (1) given below, for example. In the equation (1), "I" represents an inertia acting on the side of the transmission input shaft 34, "Nin1" represents the transmission input shaft rotational speed Nin before the shift-up action, "Nin2" represents the transmission input shaft rotational speed Nin after the shift-up action, and "ta" represents a predetermined target length of shifting time of the shift-up action, which is stored in, for example, the ROM included in the electronic control apparatus 70. The torque-reduction-amount calculating portion 94 is configured, in execution of a first torque reduction control, to calculate a torque-reduction shortage amount by which the required torque-reduction amount Ttd is not reached by only reducing the torque Tm of the electric motor MG, namely, an additional torque-reduction amount by which the torque Te of the engine 14 is required to be reduced in addition to the reduction of the torque Tm of the electric motor MG. Thus, the torque-reduction shortage amount, by which the required torque-reduction amount Ttd is not reached by the reduction of the torque Tm of the electric motor MG, is compensated by the additional torque-reduction amount by which the torque Te of the engine 14 is reduced, so that, normally, the torque Tm of the electric motor MG is reduced by an amount larger than an amount by which the torque Te of the engine 14 is reduced.

$$Ttd=I^*(Nin2-Nin1)/ta \quad (1)$$

For assuring the required torque-reduction amount Ttd that is calculated by the torque-reduction-amount calculating portion 94, the torque-reduction determining portion 95 determines which one of the first shift-up action control portion 100 and the second shift-up action control portion 102 is to be selected, depending on whether at least one of at least one predetermined condition is satisfied or not. The first shift-up action control portion 100 includes the first torque-reduction control portion 96 configured to reduce at least the torque Te of the engine 14 in a state in which the friction clutch 32 being engaged, such that the required torque-reduction amount Ttd is assured. The second shift-up action control portion 102 includes the second torque-reduction control portion 97 configured to reduce the torque Tm of the electric motor MG in a state in which the friction clutch 32 being released, such that the required torque-reduction amount Ttd is assured. Upon execution of the shift-up action, the torque-reduction determining portion 95 selects execution of the first shift-up action control by the first shift-up action control portion 100, when at least one of predetermined conditions is satisfied. On the other hand, the torque-reduction determining portion 95 selects execution of the second shift-up action control by the second shift-up action control portion 102, when any one of the predetermined conditions is not satisfied. The predetermined conditions consist of, for example, a condition that the required torque-reduction amount Ttd cannot be obtained by reduction of the torque Tm of the electric motor MG, a condition that a difference between a rotational speed of one of the crank shaft 48 and the connecting shaft 50 as the above-described two rotary members and a rotational speed of the other of the crank shaft 48 and the connecting shaft 50 is not larger than a given difference value, and a condition that the required drive force (i.e., required accelerating force) of the vehicle 10 is smaller than a predetermined value. Thus, upon execution of the shift-up action of the automatic transmission 20, the torque or torques of one or both of the electric motor MG and the engine 14 are reduced depending on the running state of the vehicle 10, so as to obtain the required torque-reduction amount Ttd corresponding to the inertia torque fluctuation amount, for thereby reducing the inertia torque while reducing the length of time required for completion of the shift-up action. It is noted that, in the present embodiment, the crank shaft 48 and the connecting shaft 50 correspond to "two rotary members (that are to be connected and disconnected by the friction clutch)", which are recited in the appended claims.

The first torque-reduction control portion 96 executes a control for restraining the torque fluctuation in the inertia phase of the shift-up action, by reducing both of the torque Te of the engine 14 and the torque Tm of the electric motor MG, or alternatively, by reducing only the torque Te of the engine 14. The second torque-reduction control portion 97 executes a control for restraining the torque fluctuation in the inertia phase of the shift-up action, by reducing only the torque Tm of the electric motor MG. The reduction of the torque Te of the engine 14 may be made, for example, by a partial fuel cut by which the fuel supply to some of cylinders of the engine 14 is limited, a retarding control by which the ignition timing of the engine 14 is retarded, or a closing control by which the throttle opening degree is reduced. The reduction of the torque Tm of the electric motor MG may be made, for example, by a regenerative control of the electric motor MG by which the supply of the electric power from the inverter 38 to the electric motor MG is controlled.

The friction-clutch control portion 98 engages and disengages (e.g., releases) the friction clutch 32 and executes a control for increasing and reducing the torque capacity Tck of the friction clutch 32.

When the shift-up action of the automatic transmission 20 is to be executed in the hybrid running mode with the friction clutch 32 being placed in the non-engaged state, the first shift-up action control portion 100 executes a first shift-up action control by which the shift-up action starts to be executed after the friction clutch 32 has been engaged. In execution of the first shift-up action control, the first shift-up action control portion 100 causes the first torque-reduction control portion 96 to execute a first torque-reduction control to temporarily reduce the torque Te of the engine 14 in the inertial phase of the first shift-up action. When the shift-up action of the automatic transmission 20 is to be executed, the second shift-up action control portion 102 executes a second shift-up action control to cause the second torque-reduction control portion 97 to execute a second torque-reduction control to temporarily reduce the torque Tm of the electric motor GM in the inertial phase of the second shift-up action, by regenerating the electric motor MG.

When it is determined by the torque-reduction determining portion 95 that the required torque-reduction amount Ttd is obtained by only reduction of the torque Tm of the electric motor MG, the torque-reduction determining portion 95 selects the second shift-up action control portion 102 upon execution of the shift-up action of the automatic transmission 20, so that the friction clutch 32 is held in the non-engaged state, e.g., released state, by the friction-clutch control portion 98. Upon determination made by the transmission-shifting control portion 92 that there is a request for execution of the shift-up action, when the vehicle 10 is running in the electric motor running with the electric motor MG outputting the torque for driving the vehicle 10, the second shift-up action control portion 102 reduces the torque Tm of the electric motor MG, and also reducing the throttle opening degree as needed. The reduction of the throttle opening degree is made upon execution of the shift-up action, because there is a risk of breakage of the one-way clutch 30 if a torque difference between the torque Te of the engine 14 and the reduced torque Tm of the electric motor MG exceeds the torque capacity Tco of the one-way clutch 30. Further, upon release of the torque reduction, the second torque-reduction control portion 97 executes a control by which the torques Te, Tm are returned to respective pre-reduction torque values (i.e., torque values before the torque reduction) when the shift-up action is completed, because a shock would be caused in the one-way clutch 30 if the return of the torques Te, Tm to the pre-reduction torque values were delayed. Further, during execution of the second torque-reduction control, the second shift-up action control portion 102 controls the engine 14 and the electric motor MG such that the engine rotational speed Ne is not made lower than the electric motor rotational speed Nm, for thereby restraining a shock that is likely to be caused by engagement of the one-way clutch 30 after the torque reduction.

Figure 2:
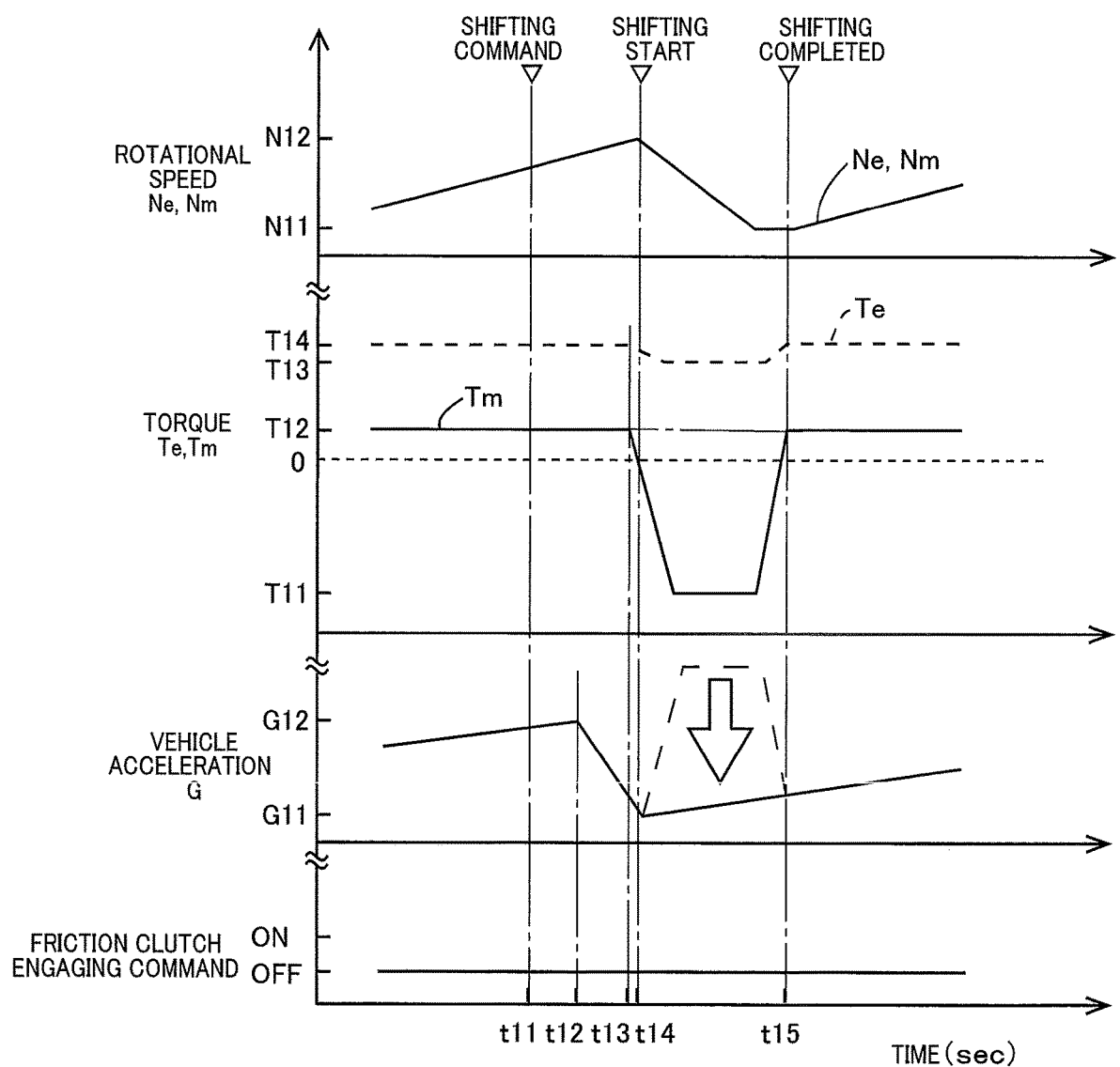
FIG. 2 is a time chart showing, by way of example, a control operation executed according to the invention when a shift-up action is executed in the vehicle shown in FIG. 1.

FIG. 2 is a time chart showing, by way of example, a control operation executed when the shift-up action is executed as a result of determination that the shift-up action should be executed during the hybrid running with the drive forces of the electric motor MG and the engine 14, wherein it is determined that the required torque-reduction amount Ttd can be obtained by only reduction of the torque Tm of the electric motor MG, so that the friction clutch 32 is held released. Since the accelerator operation amount θacc is kept at a constant value, the engine rotational speed Ne and the electric motor rotational speed Nm are both increased gradually before and after the shift-up action. At a point t11 of time, it is determined that the required torque-reduction amount Ttd can be obtained by only reduction of the torque Tm of the electric motor MG, so that the friction clutch 32 is held released. Further, at the point t11 of time, a command is generated to request the execution of the shift-up action by releasing and engaging actions of corresponding ones of the plurality of engagement devices in the form of the clutches C, so that the hydraulic control unit 60 starts to control the releasing and engaging actions the clutches C at the point t11 of time, and a vehicle acceleration G is reduced from a point t12 of time. Then, at a point t13 of time, the reduction of the torque Tm of the electric motor MG is started and at the same time the torque Te of the engine 14 is also reduced slightly. At a point t14 of time, the shift-up action, i.e., the inertia phase starts whereby the engine rotational speed Ne and the electric motor rotational speed Nm start to be reduced. At this point t14 of time, the vehicle acceleration G is G11. After the point t14 of time, the electric motor torque Tm, which was T12 at the point of time t13, is reduced to T11 that is a negative torque value. Meanwhile, the engine torque Te, which was T14 at the point of time t13, is reduced to T13. Owing to the torque down, the vehicle acceleration G is reduced from broken line to solid line, as indicated by white arrow. The engine rotational speed Ne and the electric motor rotational speed Nm are controlled to be reduced from the point t14 of time at a rate equal to or close to a predetermined reduction rate that is stored in, for example, in the ROM included in the electronic control apparatus 70. Then, at a point t15 of time, it is determined that the shift-up action is completed, namely, the releasing and engaging actions of the corresponding engagement devices are completed, when a given length of time has elapsed after the engine rotational speed Ne and the electric motor rotational speed Nm have reached a synchronized speed after the shift-up action. The reductions of the torques Tm, Te are terminated at the point t15 of time or by the determination that the shift-up action is completed.

During running of the vehicle 10 at the running speed that is not lower than the given speed value Va, when the transmission-shifting control portion 92 determines that a shift-up action is required to be executed and the friction-clutch control portion 98 determines that the friction clutch 32 is in its released state, the torque-reduction-amount calculating portion 94 calculates the required torque-reduction amount Ttd. When it is determined by the torque-reduction determining portion 95 that the required torque-reduction amount Ttd is obtained by only reduction of the torque Tm of the electric motor MG and it is determined by the hybrid control portion 90 that the electric motor MG is outputting the torque for driving the vehicle 10, the second shift-up action control portion 102 starts execution of the shift-up action while reducing the torque Tm of the electric motor MG by regenerative control and holding the friction clutch 32 released. The electric motor torque Tm is returned to the pre-reduction torque value upon completion of the shift-up action, because a shock would be caused if the return of the torque Tm to the pre-reduction torque value were made with delay after the completion of the shift-up action. Further, during execution of the second torque-reduction control, the second shift-up action control portion 102 controls the engine 14 and the electric motor MG such that the engine rotational speed Ne is not made lower than the electric motor rotational speed Nm, for thereby restraining a shock that is likely to be caused by engagement of the one-way clutch 30 after the torque reduction.

During running of the vehicle 10 at the running speed that is not lower than the given speed value Va, when the transmission-shifting control portion 92 determines that a shift-up action is required to be executed and the friction-clutch control portion 98 determines that the friction clutch 32 is in its released state, the torque-reduction-amount calculating portion 94 calculates the required torque-reduction amount Ttd. When the torque-reduction determining portion 95 determines that the required torque-reduction amount Ttd cannot be obtained by only reduction of the torque Tm of the electric motor MG, namely, when the torque Te of the engine 14 is also required to be reduced, the torque Te of the engine 14 is reduced.

When it is determined that the torque Te of the engine 14 is required to be reduced, the first shift-up action control portion 100 causes the friction clutch 32 to be engaged by the friction-clutch control portion 98. The engagement of the friction clutch 32 may be made when a speed difference Nd between the electric motor rotational speed Nm and the engine rotational speed Ne becomes not larger than a predetermined difference value Nda. The engine 14 is connected to the electric motor MG via the connecting shaft 50 through the one-way clutch 30 and the friction clutch 32 that are disposed in parallel to each other, so that the friction clutch 32 is required to be engaged for using the reduction of the torque Te of the engine 14 for obtaining the required torque-reduction amount Ttd. The torque-reduction-amount calculating portion 94 calculates the torque-reduction shortage amount, i.e., a reduced torque amount Ttde to which the torque Te of the engine 14 is required to be reduced for obtaining the required torque-reduction amount Ttd, and then the transmission-shifting control portion 92 determines whether the calculated reduced torque amount Ttde exceeds a maximum torque capacity Tckmax of the friction clutch 32 or not. When it is determined that the reduced torque amount Ttde of the engine 14 can be transmitted through the friction clutch 32, the friction-clutch control portion 98 increases the torque capacity Tck of the friction clutch 32 to a torque capacity value exceeding the reduced torque amount Ttde of the engine 14. When the transmission-shifting control portion 92 determines that it is difficult to cause the torque capacity Tck of the friction clutch 32 to be increased to the reduced torque amount Ttde (to which the torque Te of the engine 14 is to be reduced), the first torque-reduction control portion 96 causes the reduced torque amount Ttde to be not larger than the maximum torque capacity Tckmax of the friction clutch 32.

The torque-reduction-amount calculating portion 94 determines whether the torque Tm of the electric motor MG can be reduced. When it is difficult to reduce the torque Tm of the electric motor MG, for example, due to a large value of the stored electric power amount SOC, the torque-reduction-amount calculating portion 94 determines that the torque Tm of the electric motor MG cannot be reduced. When it is determined that the torque Tm of the electric motor MG cannot be reduced, the transmission-shifting control portion 92 executes the shift-up action by the releasing and engaging actions of the corresponding clutches C of the automatic transmission 20, and the first shift-up action control portion 100 reduces only the torque Te of the engine 14 and returns the torque Te to the pre-reduction torque value when the shift-up action is completed. On the other hand, when the torque-reduction-amount calculating portion 94 determines that the torque Tm of the electric motor MG can be reduced, the transmission-shifting control portion 92 executes the shift-up action by the releasing and engaging actions of the corresponding clutches C of the automatic transmission 20, and the first shift-up action control portion 100 reduces the torques Te, Tm of the engine 14 and the electric motor MG and returns the torques Te, Tm to the pre-reduction torque values when the shift-up action is completed.

Figure 3:
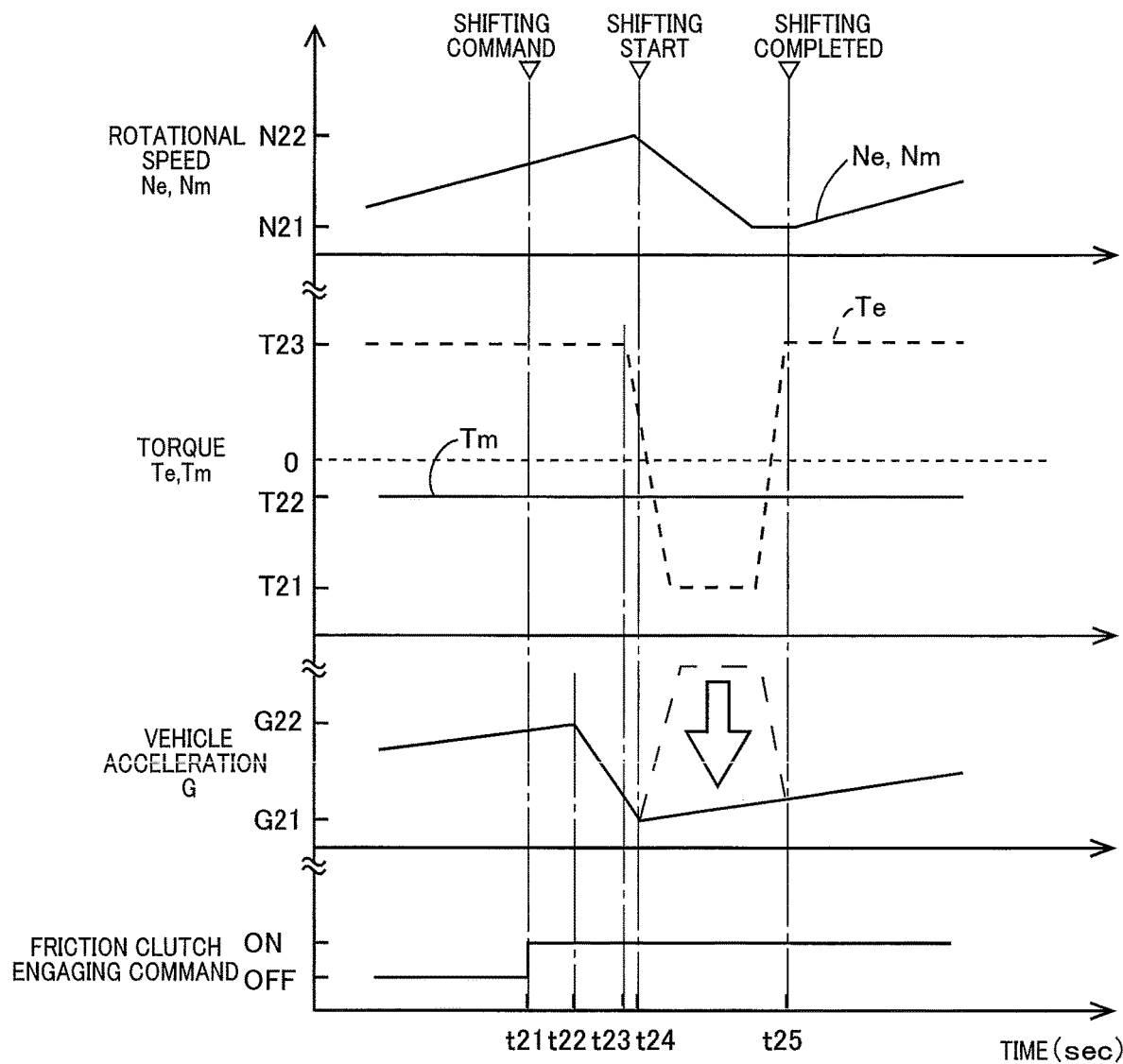
FIG. 3 is a time chart showing, by way of another example, a control operation executed according to the invention when a shift-up action is executed in the vehicle shown in FIG. 1.

FIG. 3 is a time chart showing, by way of example, a control operation executed when it is determined that the shift-up action is to be executed during the hybrid running with the drive forces of the electric motor MG and the engine 14, wherein only the torque Te of the engine 14 is reduced and the friction clutch 32 is switched from the released state to the engaged state. The engine rotational speed Ne and the electric motor rotational speed Nm are gradually increased before and after the shift-up action. At a point t21 of time, it is determined that the torque Tm of the electric motor MG cannot be reduced, for example, due to a large value of the stored electric power amount SOC, and the friction clutch 32 is switched from the released state to the engaged state. Further, at the point t21 of time, a command is generated to request the execution of the shift-up action by releasing and engaging actions of corresponding ones of the plurality of engagement devices in the form of the clutches C, so that the hydraulic control unit 60 starts to control the releasing and engaging actions the clutches C at the point t21 of time, and a vehicle acceleration G is reduced from a point t22 of time. Then, at a point t23 of time, the torque Te of the engine 14 starts to be reduced. At a point t24 of time, the shift up action, i.e., the inertia phase starts whereby the engine rotational speed Ne and the electric motor rotational speed Nm start to be reduced. At this point t24 of time, the vehicle acceleration G is G21. After the point t24 of time, the engine torque Te, which was T23 at the point of time t23, is reduced to T21 that is a negative torque value. Meanwhile, the engine torque Te, which was T23 at the point of time t23, is reduced to T13. Meanwhile, the electric motor torque Tm, which is not reduced, for example, due to a large value of the stored electric power amount SOC, is held at T22. Owing to the torque down, the vehicle acceleration G is reduced from broken line to solid line, as indicated by white arrow. Then, at a point t25 of time, it is determined that the shift-up action is completed, namely, the releasing and engaging actions of the corresponding engagement devices are completed, when a given length of time has elapsed after the engine rotational speed Ne and the electric motor rotational speed Nm have reached a synchronized speed after the shift-up action. The reduction of the torque Te is terminated at the point t25 of time or by the determination that the shift-up action is completed.

Figure 4:
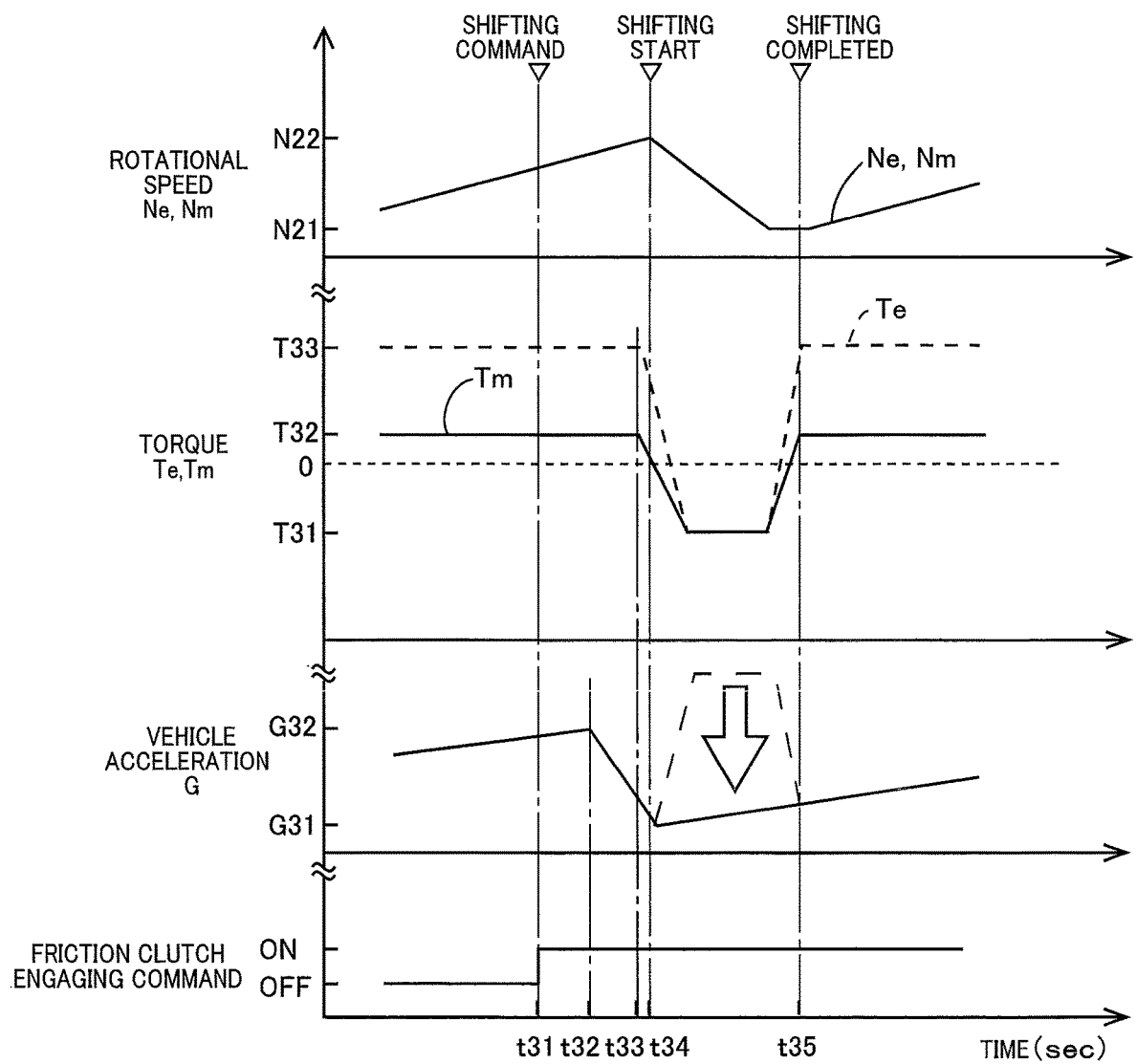
FIG. 4 is a time chart showing, by way of still another example, a control operation executed according to the invention when a shift-up action is executed in the vehicle shown in FIG. 1.

FIG. 4 is a time chart showing, by way of example, a control operation executed when it is determined that the shift-up action is to be executed during the hybrid running with the drive forces of the electric motor MG and the engine 14, wherein the required torque-reduction amount Ttd cannot be obtained by only reduction of the torque Tm of the electric motor MG so that the torque Te of the engine 14 as well as the torque Tm of the electric motor MG is reduced. Since the accelerator operation amount θacc is kept at a constant value, the engine rotational speed Ne and the electric motor rotational speed Nm are both increased gradually before and after the shift-up action. At a point t31 of time, it is determined that both of the torque Te of the engine 14 and the torque Tm of the electric motor MG are required to be reduced for obtaining the required torque-reduction amount Ttd, and the friction clutch 32 is switched from the released state to the engaged state. Further, at the point t31 of time, a command is generated to request the execution of the shift-up action by releasing and engaging actions of corresponding ones of the plurality of engagement devices in the form of the clutches C of the automatic transmission 20, so that the hydraulic control unit 60 starts to control the releasing and engaging actions the clutches C, so that the vehicle acceleration G starts to be reduced from G32 at a point t32 of time. Then, at a point t33 of time, the reductions of the torque Te of the engine 14 and the torque Tm of the electric motor MG are started. At a point t34 of time, the shift up action, i.e., the inertia phase starts whereby the engine rotational speed Ne and the electric motor rotational speed Nm start to be reduced. At this point t34 of time, the vehicle acceleration G is G31. After the point t34 of time, the engine torque Te, which was T33 at the point t33 of time, is reduced to T31 that is a negative torque value, while the electric motor torque Tm, which was T32 at the point t33 of time, is reduced to T31 that is a negative torque value. Owing to the torque down, the vehicle acceleration G is reduced from broken line to solid line, as indicated by white arrow. The engine rotational speed Ne and the electric motor rotational speed Nm are controlled to be reduced from the point t32 of time (at which the shift-up action is started) at a rate equal to or close to a predetermined reduction rate that is stored in, for example, in the ROM included in the electronic control apparatus 70. Then, at a point t35 of time, it is determined that the shift-up action is completed, namely, the releasing and engaging actions of the corresponding engagement devices are completed, when a given length of time has elapsed after the engine rotational speed Ne and the electric motor rotational speed Nm have reached a synchronized speed after the shift-up action. The reductions of the torques Tm, Te are terminated at the point t35 of time or by the determination that the shift-up action is completed.

Figure 5:
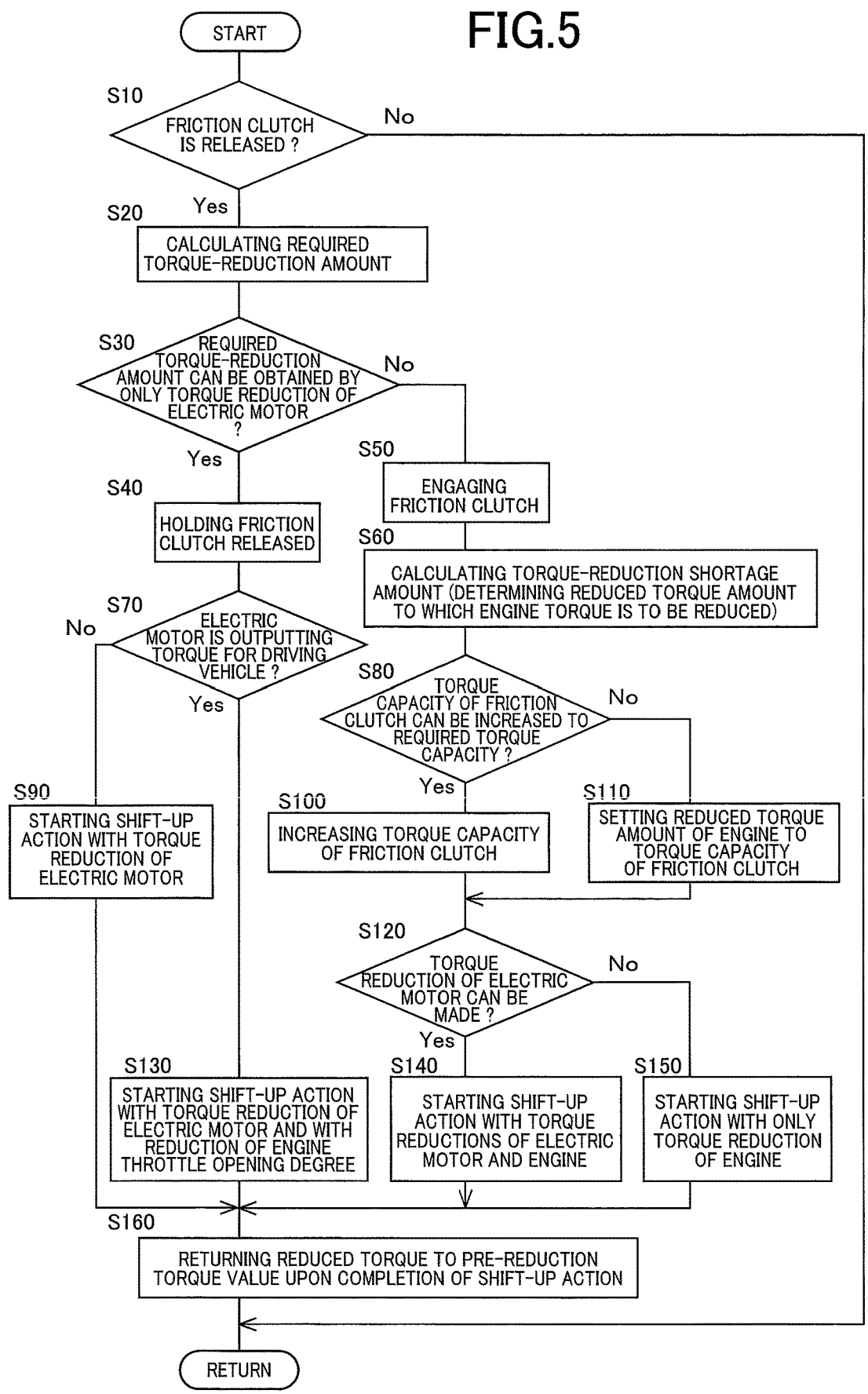
FIG. 5 is a flow chart showing a main part of a control routine executed by an electronic control apparatus shown in FIG. 1, namely, a control routine that is executed, upon execution of a shift-up action in the drive-force transmitting apparatus, for torque reductions of an engine and an electric motor and engagement of a friction clutch.

FIG. 5 is a flow chart showing a main part of a control routine executed by the electronic control apparatus 70 shown in FIG. 1, namely, a control routine that is executed when a command requesting execution of a shift-up action during the hybrid running of the vehicle 10. As shown in FIG. 5, the control routine is initiated with step S10 corresponding to function of the transmission-shifting control portion 92, which is implemented to determine whether the friction clutch 32 is in the released state. When a negative determination is made at step S10, step S10 is implemented again. That is, as long as the negative determination is made at step S10, step S10 is repeatedly implemented. When an affirmative determination is made at step S10, step S20 corresponding to function of the torque-reduction-amount calculating portion 94 is implemented to calculate the required torque-reduction amount Ttd that is required upon execution of the shift-up action. Step S20 is followed by step S30 corresponding to function of the torque-reduction determining portion 95, which is implemented to determine whether the required torque-reduction amount Ttd can be obtained by only reducing the torque Tm of the electric motor MG. When an affirmative determination is made at step S30, step S40 corresponding to function of the friction-clutch control portion 98 is implemented whereby the friction clutch 32 is held released. Step S40 is followed by step S70 corresponding to function of the hybrid control portion 90, which is implemented to determine whether the electric motor MG is outputting the torque for driving the vehicle 10. When an affirmative determination is made at step S70, step S130 corresponding to functions of the transmission-shifting control portion 92, hybrid control portion 90 and second torque-reduction control portion 97 is implemented to start execution of the shift-up action, and to reduce the torque Tm of the electric motor MG while reducing the engine throttle opening degree as needed. Then, step S160 corresponding to function of the hybrid control portion 90 is implemented to return the reduced torque Tm or torques Tm, Te to the pre-reduction torque value or values, concurrently with completion of the shift-up action. When it is determined at step S70 that the electric motor MG is not outputting the torque for driving the vehicle 10, namely, when a negative determination is made at step S70, the control flow goes to step S90 corresponding to functions of the transmission-shifting control portion 92, hybrid control portion 90 and second torque-reduction control portion 97, which is implemented to start execution of the shift-up action, and to reduce the torque Tm of the electric motor MG. Then, step S160 is implemented to return the reduced torque Tm to the pre-reduction torque value, concurrently with completion of the shift-up action. It is noted that, during execution of the second torque-reduction control, the second shift-up action control portion 102 controls the engine 14 and the electric motor MG such that the engine rotational speed Ne is not made lower than the electric motor rotational speed Nm, for thereby restraining a shock that is likely to be caused by engagement of the one-way clutch 30 after the torque reduction.

At step S30 that is implemented to determine whether the required torque-reduction amount Ttd can be obtained by only reducing the torque Tm of the electric motor MG, if a negative determination is made, the control flow goes to step S50 corresponding to function of the friction-clutch control portion 98, which is implemented to engage the friction clutch 32. Step S50 is followed by step S60 corresponding to function of the torque-reduction-amount calculating portion 94, which is implemented to calculate the torque-reduction shortage amount by which the required torque-reduction amount Ttd is not reached by only reducing the torque Tm of the electric motor MG, namely, the reduced torque amount Ttde to which the torque Te of the engine 14 is required to be reduced, in addition to the reduction of the torque Tm of the electric motor MG, for obtaining the required torque-reduction amount Ttd. Thus, the torque-reduction shortage amount, by which the required torque-reduction amount Ttd is not reached by only the reduction of the torque Tm of the electric motor MG, is compensated by the additional torque-reduction amount by which the torque Te of the engine 14 is reduced, so that, normally, the torque Tm of the electric motor MG is reduced by an amount larger than an amount by which the torque Te of the engine 14 is reduced. Step S60 is followed by step S80 corresponding to function of the transmission-shifting control portion 92, which is implemented to determine whether the reduced torque amount Ttde of the engine 14, i.e., a required torque capacity Tcn can be transmitted through the friction clutch 32, in a case in which the torque capacity Tck of the friction clutch 32 is increased to the maximum torque capacity Tckmax that is larger than a normal engagement value of the torque capacity Tck (that is a value when the friction clutch 32 is normally engaged). When an affirmative determination is made at step S80, step S100 corresponding to function of the friction-clutch control portion 98 is implemented to increase the torque capacity Tck of the friction clutch 32. When a negative determination is made at step S80, the control flow goes to step S110 corresponding to function of the first torque-reduction control portion 96, which is implemented to set the reduced torque amount Ttde of the engine 14 to the normal engagement value of the torque capacity Tck. It is noted that the reduced torque amount Ttde of the engine 14 may be set to a predetermined value that is smaller than the normal engagement value of the torque capacity Tck.

Step S100 or step S110 is followed by step S120 corresponding to function of the torque-reduction-amount calculating portion 94, which is implemented to determine whether the torque Tm of the electric motor MG can be reduced. When an affirmative determination is made at step S120, step S140 corresponding to functions of the transmission-shifting control portion 92, hybrid control portion 90 and first torque-reduction control portion 96 is implemented to start execution of the shift-up action and to reduce the torques Te, Tm of the engine 14 and the electric motor MG. Step 140 is followed by step S160 corresponding to function of the hybrid control portion 90, which is implemented to return the reduced torques Tm, Te to the pre-reduction torque values, concurrently with completion of the shift-up action. When it is determined at step S120 that the torque Tm of the electric motor MG cannot be reduced, the control flow goes to step S150 corresponding to functions of the transmission-shifting control portion 92, hybrid control portion 90 and first torque-reduction control portion 96, which is implemented to start execution of the shift-up action and to reduce only the torque Te of the engine 14. Step 150 is followed by step S160 corresponding to function of the hybrid control portion 90, which is implemented to return the reduced torque Te to the pre-reduction torque value before the torque reduction, concurrently with completion of the shift-up action.

As described above, in the present embodiment, when the shift-up action of the automatic transmission 20 is to be executed with the hybrid running mode being selected and with the friction clutch 32 being in the non-engaged state, the first shift-up action control is executed whereby the shift-up action starts to be executed after the friction clutch 32 has been engaged. Owing to this arrangement, the torque reduction caused by the engagement of the friction clutch 32 can be utilized in the execution of the shift-up action of the automatic transmission 20, whereby the shifting responsiveness can be improved. Further, since the shifting action of the automatic transmission 20 is executed with the friction clutch 32 being placed in its engaged state, it is possible to reduce a length of time required to complete the shifting action and avoid the drive force from being delayed to be transmitted.

In the present embodiment, the vehicle 10 includes the engine 14, the electric motor MG, the friction clutch 32, the one-way clutch 30, the automatic transmission 20 and the drive wheels 42, such that the friction clutch 32 and the one-way clutch 30 are disposed in parallel with each other between the engine 14 and the electric motor MG as the drive force sources, and such that the automatic transmission 20 is disposed between the electric motor MG and the drive wheels 42, wherein the friction clutch 32 is configured to connect and disconnect between the engine 14 and the electric motor MG, while the one-way clutch 30 is configured to transmit a drive force in a direction from the engine 14 toward the electric motor MG, and wherein the vehicle 10 is to run in a selected one of (i) an electric-motor running mode with operation of the electric motor MG and (ii) a hybrid running mode with operation of the engine 14. Upon execution of the shift-up action of the automatic transmission 20 with the hybrid running mode being selected and with the friction clutch 32 being in the non-engaged state, the electronic control apparatus 70 executes the first torque reduction control Cdc1 by which the temporal torque reduction is made by using at least the engine 14 with the friction clutch 32 being placed in the engaged state or the second torque reduction control Cdc2 by which the temporal torque reduction is made by using the electric motor MG with the friction clutch 32 being placed in the released state. Owing to this arrangement, it is possible to reduce the length of time required to complete the shift-up action of the automatic transmission 20 and reduce the shock upon the shift-up action by executing a selected one of the first torque reduction control Cdc1 and the second torque reduction control Cdc2.

In the present embodiment, when at least one of the predetermined conditions is satisfied, for example, when the required torque-reduction amount Ttd cannot be obtained by reduction of the torque Tm of the electric motor MG, the first shift-up action control is executed by the first shift-up action control portion 100. When any one of the predetermined conditions is not satisfied, the second shift-up action control is executed by the second shift-up action control portion 102 whereby the shift-up action is executed with the friction clutch 32 being held in the non-engaged state and with the torque Tm of the electric motor MG being temporarily reduced during execution of the shift-up action. Owing to this arrangement, it is possible to execute one of the first shift-up action control and the second shift-up action control, which is selected suitably depending on a drive condition of the vehicle 10, whereby a drive force responsiveness can be improved while a shifting shock and a hydraulic pressure loss can be reduced.

In the present embodiment, at least the torque Te of the engine 14 is temporarily reduced during execution of the shift-up action when the first shift-up action control is executed by the first shift-up action control portion 100, and the torque Tm of the electric motor MG is temporarily reduced during execution of the shift-up action when the second shift-up action control is executed by the second shift-up action control portion 102. Owing to this arrangement, in a case in which the length of time required to complete the shift-up action would be long if the torque reduction in the execution of the shift-up action is made by only reduction of the torque Tm of the electric motor MG, it is possible to quickly execute the shift-up action by utilizing reduction of the torque Te of the engine 14, by executing the shift-up action after engaging the friction clutch 32.

In the present embodiment, when the difference between the rotational speed of the input-side rotary member of the friction clutch 32 and the rotational speed of the output-side rotary member of the friction clutch 32 is not larger than the given difference value, or when the required acceleration of the vehicle 10 is not higher than the given acceleration value. Owing to this arrangement, when the rotational speed difference between the input-side rotary member and the output-side rotary member of the friction clutch 32 is small, it is possible to increase the drive force responsiveness by executing the shift-up action of the automatic transmission 20 after engaging the friction clutch 32.

In the present embodiment, when the first shift-up action control is executed by the first shift-up action control portion 100, the torque Tm of the electric motor MG as well as the torque Te of the engine 14 is temporarily reduced during execution of the shift-up action, such that the torque Tm of the electric motor MG is reduced by an amount that is larger than an amount by which the torque Te of the engine 14 is reduced. Owing to this arrangement, the torque reduction is made by using mainly the electric motor MG which is better in responsiveness and is capable of recycling energy, whereby the shifting responsiveness and a fuel economy of the vehicle 10 can be both improved.

In the present embodiment, the required torque-reduction amount Ttd, which is required in the temporal torque reduction in each of the first and second torque reduction controls Cdc1, Cdc2, is calculated based on a target length of shifting time of the shift-up action. It is possible to execute one of the first and second torque reduction controls Cdc1, Cdc2, which is selected suitably depending on a drive condition of the vehicle 10, whereby a drive force responsiveness can be improved while a shifting shock and a hydraulic pressure loss can be reduced.

In the present embodiment, when the first torque reduction control Ccd1 is executed, the torque Tm of the electric motor MG is reduced and the torque Te of the engine 14 is reduced to a reduced torque, and the friction clutch 32 is controlled to have a torque capacity Tck that is larger than an absolute value of the reduced torque of the engine 14. Owing to this arrangement, it is possible to avoid or reduce slipping of the friction clutch 32, while avoiding or reducing shock upon the shift-up action owing to the obtained torque-reduction amount.

In the present embodiment, when it is determined that the required torque-reduction amount Ttd cannot be obtained by reducing the torque Tm of the electric motor MG without reducing the torque Te of the engine 14, namely, cannot be obtained by only a reduced torque mount Ttdm of the electric motor MG, the control apparatus 70 is configured to execute the first torque reduction control Cdc1 in which the torque Te of the engine 14 is reduced to a torque value (i.e. reduced torque amount Ttde) that is determined such that the required torque-reduction amount Ttd is obtained. Owing to this arrangement, the required torque-reduction amount Ttd is obtained whereby the shock upon the shift-up action can be reduced. Further, the torque reduction is made by using mainly the electric motor MG that is controllable more accurately and quickly than the engine 14, it is possible to improve accuracy and speed of the torque reduction.

In the present embodiment, when it is determined that the torque Tm of the electric motor MG cannot be reduced, the control apparatus 70 is configured to execute first torque reduction control Cdc1, by reducing the torque Te of the engine 14 without reducing the torque Tm of the electric motor MG, so that the shock upon the shift-up action can be reduced.

In the present embodiment, when it is determined that the torque capacity Tck of the friction clutch 32 cannot be increased to be larger than the absolute value of the reduced torque amount Ttde of the engine 14, the absolute value of the reduced torque amount Ttde (to which the torque Te of the engine 14 is to be reduced) is reduced to be not larger than the torque capacity Tck of the friction clutch 32. Owing to this arrangement, it is possible to restrain durability of the friction clutch 32 from being reduced due to slipping of the friction clutch 32, while reducing the shock upon the shift-up action.

In the present embodiment, when it is determined that the required torque-reduction amount Ttd can be obtained by reducing only the torque Tm of the electric motor MG without reducing the torque Te of the engine 14, the control apparatus 70 is configured to execute the second torque reduction control Cdc2. Owing to this arrangement, it is possible to reduce the shock upon the shift-up action and also to improve accuracy and speed of the torque reduction by using the electric motor MG that is controllable more accurately and quickly than the engine 14.

In the present embodiment, when the second torque reduction control Cdc2 is executed, the rotational speed Ne of the engine 14 is controlled to be not lower than the rotational speed Nm of the electric motor MG, so that it is possible to avoid a shock that could be caused in the one-way clutch 30 after the torque reduction.

In the present embodiment, the torque Te of the engine 14 and/or the torque Tm of the electric motor MG is reduced in the inertia phase of the period of the execution of the shift-up action, so that it is possible to reduce the shock upon the shift-up action at a point of time at which the shock is caused.

In the present embodiment, upon execution of the shift-up action of the automatic transmission 20 by the second shift-up action control portion 102 with the hybrid running mode being selected and with the friction clutch 32 being in the non-engaged state, the torque reduction control is executed whereby the shift-up action is executed with the friction clutch 32 being held in the non-engaged state and with the torque Tm of the electric motor MG being temporarily reduced during execution of the shift-up action. Owing to this arrangement, the torque reduction is made by using the electric motor MG that is controllable more accurately and quickly than the engine 14, it is possible to improve accuracy and speed of the torque reduction.

In the present embodiment, when the torque reduction control is executed by the second torque-reduction control portion 97, the torque reduction amount, by which the torque Tm of the electric motor MG is to be reduced, is controlled such that the rotational speed of the electric motor MG is higher than the rotational speed of the engine 14 during execution of the shift-up action. Owing to this arrangement, the rotational speed of the engine 14 is made substantially equal to the rotational speed of the electric motor MG, so that it is possible to avoid a shock that could be caused by engagement of the one-way clutch 30 during the execution of the shift-up action.

While the preferred embodiment of this invention has been described in detail by reference to the drawings, it is to be understood that the invention may be otherwise embodied.

In the above-described embodiment, the present invention is applied to the vehicle of FR (front-engine rear-drive) type including the engine 14, electric motor MG, friction clutch 32, one-way clutch 30, automatic transmission 20 and drive wheels 42, such that the friction clutch 32 and the one-way clutch 30 are disposed in parallel with each other between the engine 14 and the electric motor MG, and such that the automatic transmission 20 is disposed between the electric motor MG and the drive wheels 42, wherein the friction clutch 32 is configured to connect and disconnect between the engine 14 and the electric motor MG, while the one-way clutch 30 is configured to transmit a drive force only in a direction from the engine 14 toward the electric motor MG, and wherein the drive wheels 42 are rear wheels of the vehicle. However, the present invention is applicable also to a vehicle of FF (front-engine front-drive) type wherein the drive wheels are front wheel of the vehicle.

In the above-described embodiment, the reduced torque Te of the engine 14 and the reduced torque Tm of the electric motor MG are returned to the pre-reduction torque values, concurrently with completion of the shift-up action. However, the reduced torques Te, Tm do not have to be returned necessarily concurrently with completion of the shift-up action, but may be returned before or after completion of the shift-up action within a range in which the degree of fluctuation of the vehicle acceleration G is tolerable.

In the above-descried embodiment, during execution of the second torque-reduction control, the engine 14 and the electric motor MG are controlled such that the engine rotational speed Ne is not made lower than the electric motor rotational speed Nm. However, they may be controlled such that the rotational speed difference between the rotational speeds Ne, Nm is held within a predetermined difference value.

It is to be understood that the embodiment described above are given for illustrative purpose only, and that the present invention may be embodied with various modifications and improvements which may occur to those skilled in the art.

NOMENCLATURE OF ELEMENTS

10: hybrid vehicle
14: engine
20: automatic transmission
30: one-way clutch
32: friction clutch
42: drive wheel
70: control apparatus
MG: electric motor
Cdc1: first torque reduction control
Cdc2: second torque reduction control
ta: target length of shifting time
Ttd: required torque-reduction amount
Ttde: reduced torque amount of the engine
Ttdm: reduced torque amount of the electric motor
Tck: torque capacity of the friction clutch
Tcn: required torque capacity of the friction clutch
Nm: electric-motor rotational speed Ne: engine rotational speed
Nd: rotational speed difference

What is claimed is:

1. A control apparatus for a hybrid vehicle that includes an engine, an electric motor, a friction clutch, a one-way clutch, an automatic transmission and drive wheels, such that the friction clutch and the one-way clutch are disposed in parallel with each other between the engine and the electric motor, and such that the automatic transmission is disposed between the electric motor and the drive wheels,
wherein the friction clutch is configured to connect and disconnect between the engine and the electric motor, while the one-way clutch is configured to transmit a drive force in a direction from the engine toward the electric motor,
wherein the hybrid vehicle is to run in a selected one of (i) an electric-motor running mode with operation of the electric motor and (ii) a hybrid running mode with operation of the engine, and
wherein said control apparatus is configured, upon execution of a shift-up action of the automatic transmission with the hybrid running mode being selected and with the friction clutch being in a non-engaged state, to execute a first shift-up action control by which the shift-up action starts to be executed after the friction clutch has been engaged.

2. The control apparatus according to claim 1,
wherein said control apparatus is configured to execute said first shift-up action control, when at least one of at least one predetermined condition is satisfied upon execution of the shift-up action of the automatic transmission with the hybrid running mode being selected and with the friction clutch being in the non-engaged state, and
wherein said control apparatus is configured, when said at least one of said at least one predetermined condition is not satisfied upon execution of the shift-up action of the automatic transmission with the hybrid running mode being selected and with the friction clutch being in the non-engaged state, to execute a second shift-up action control by which the shift-up action is executed with the friction clutch being held in the non-engaged state and with a torque of the electric motor being temporarily reduced during execution of the shift-up action.

3. The control apparatus according to claim 2,
wherein, when said first shift-up action control is executed, at least a torque of the engine is temporarily reduced during execution of the shift-up action, and
wherein, when said second shift-up action control is executed, the torque of the electric motor is temporarily reduced during execution of the shift-up action.

4. The control apparatus according to claim 1,
wherein the friction clutch is configured to connect and disconnect two rotary members, and
wherein said control apparatus configured to execute said first shift-up action control, when a difference between a rotational speed of one of the two rotary members and a rotational speed of the other of the two rotary members is not larger than a given difference value, or when a required acceleration of the hybrid vehicle is not higher than a given acceleration value.

5. The control apparatus according to claim 3,
wherein, when said first shift-up action control is executed, the torque of the electric motor as well as the torque of the engine is temporarily reduced during execution of the shift-up action, such that the torque of the electric motor is reduced by an amount that is larger than an amount by which the torque of the engine is reduced.

6. The control apparatus according to claim 3,
wherein, when said first shift-up action control is executed, at least the torque of the engine is temporarily reduced for obtaining a required torque-reduction amount that is calculated based on a target length of shifting time of the shift-up action, and
wherein, when said second shift-up action control is executed, the torque of the electric motor is temporarily reduced for obtaining the required torque-reduction amount.

7. The control apparatus according to claim 5,
wherein, when said first shift-up action control is executed, the torque of the engine is reduced to a reduced torque, and the friction clutch is controlled to have a torque capacity that is larger than an absolute value of the reduced torque of the engine.

8. The control apparatus according to claim 6,
wherein, when it is determined that the required torque-reduction amount cannot be obtained by reducing the torque of the electric motor without reducing the torque of the engine, said control apparatus is configured to execute said first shift-up action control in which the torque of the engine is reduced to a torque value that is determined such that the required torque-reduction amount is obtained.

9. The control apparatus according to claim 3,
wherein, when it is determined that the torque of the electric motor cannot be reduced, said control apparatus is configured to execute said first shift-up action control, by reducing the torque of the engine without reducing the torque of the electric motor.

10. The control apparatus according to claim 7,
wherein, when it is determined that the torque capacity of the friction clutch cannot be increased to be larger than the absolute value of the reduced torque of the engine, the amount by which the torque of the engine is to be reduced is reduced to be not larger than the torque capacity of the friction clutch.

11. The control apparatus according to claim 6,
wherein, when it is determined that the required torque-reduction amount can be obtained by reducing the torque of the electric motor without reducing the torque of the engine, said control apparatus is configured to execute said second shift-up action control.

12. The control apparatus according to claim 11,
wherein, when said second shift-up action control is executed, a rotational speed of the engine is controlled to be not lower than a rotational speed of the electric motor.

13. The control apparatus according to claim 3,
wherein, when said first shift-up action control is executed, at least the torque of the engine is reduced in an inertia phase of a period of the execution of the shift-up action, and
wherein, when said second shift-up action control is executed, the torque of the electric motor is reduced in the inertia phase of the period of the execution of the shift-up action.

14. The control apparatus according to claim 1,
wherein said control apparatus is configured, upon execution of the shift-up action of the automatic transmission with the hybrid running mode being selected and with the friction clutch being in the non-engaged state, to execute a torque reduction control by which the shift-up action is executed with the friction clutch being held in the non-engaged state and with a torque of the electric motor being temporarily reduced during execution of the shift-up action.

15. The control apparatus according to claim 14, wherein, when said torque reduction control is executed, a torque reduction amount, by which the torque of the electric motor is to be reduced, is controlled such that a rotational speed of the electric motor is higher than a rotational speed of the engine during execution of the shift-up action.

16. The control apparatus according to claim 1, comprising:
   a first shift-up action control portion configured to execute said first shift-up action control by which the shift-up action starts to be executed after the friction clutch has been engaged, and
   a second shift-up action control portion configured to execute a second shift-up action control by which the shift-up action is executed with the friction clutch being held in the non-engaged state and with a torque of the electric motor being temporarily reduced during execution of the shift-up action.

\* \* \* \* \*